United States Patent

Thompson et al.

[11] Patent Number: 5,841,081
[45] Date of Patent: Nov. 24, 1998

[54] METHOD OF ATTENUATING SOUND, AND ACOUSTICAL INSULATION THEREFOR

[75] Inventors: Delton R. Thompson, Woodbury; Randall L. Knoll, Stillwater, both of Minn.

[73] Assignee: Minnesota Mining and Manufacturing Company, St. Paul, Minn.

[21] Appl. No.: 669,896

[22] Filed: Jun. 21, 1996

Related U.S. Application Data

[60] Provisional application No. 60/000,467 Jun. 23, 1995.

[51] Int. Cl.⁶ .................................................. E04B 1/82
[52] U.S. Cl. ........................... 181/286; 181/290; 181/294; 181/296; 428/903; 428/297.1; 428/298.4
[58] Field of Search .................................. 181/286, 290, 181/294, 296; 428/903, 297.1, 298.4

[56] References Cited

U.S. PATENT DOCUMENTS

| | | |
|---|---|---|
| T100,902 | 8/1981 | Hauser . |
| 2,464,301 | 3/1949 | Francis, Jr. . |
| 3,016,599 | 1/1962 | Perry, Jr. . |
| 4,011,067 | 3/1977 | Carey, Jr. . |
| 4,041,203 | 8/1977 | Brock et al. ........................... 428/157 |
| 4,068,036 | 1/1978 | Stanistreet ............................. 428/296 |
| 4,069,026 | 1/1978 | Simm et al. . |
| 4,118,531 | 10/1978 | Hauser ................................. 428/224 |
| 4,196,245 | 4/1980 | Kitson et al. ......................... 428/198 |
| 4,379,192 | 4/1983 | Wahlquist et al. .................... 428/156 |
| 4,420,526 | 12/1983 | Schilling .............................. 428/156 |
| 4,547,420 | 10/1985 | Krueger et al. ...................... 428/229 |
| 4,568,581 | 2/1986 | Peoples, Jr. . |
| 4,714,647 | 12/1987 | Shipp, Jr. et al. ................... 428/212 |
| 4,766,029 | 8/1988 | Brock et al. .......................... 428/286 |
| 4,795,668 | 1/1989 | Krueger et al. ...................... 428/174 |
| 4,828,910 | 5/1989 | Haussling ............................. 428/284 |
| 4,837,067 | 6/1989 | Carey, Jr. et al. .................... 428/108 |
| 4,851,283 | 7/1989 | Holtrop et al. ....................... 428/284 |
| 4,946,738 | 8/1990 | Chenoweth et al. ................. 422/284 |
| 5,073,436 | 12/1991 | Antonacci et al. ................... 428/219 |
| 5,298,694 | 3/1994 | Thompson et al. ................... 181/286 |
| 5,437,922 | 8/1995 | Jackson et al. ....................... 428/288 |
| 5,459,291 | 10/1995 | Haines et al. ........................ 181/286 |
| 5,480,466 | 1/1996 | Jackson et al. ....................... 55/528 |
| 5,508,102 | 4/1996 | Georger et al. ...................... 428/297 |

FOREIGN PATENT DOCUMENTS 0 607 946 A1   7/1994   European Pat. Off. .

OTHER PUBLICATIONS

Wente, V.A., *Superfine Thermoplastic Fibers*, Industrial Engineering Chemistry, V. 48, p. 1342 et seq. (1956).
Wente, V.A. et al., *Manufacture of Superfine Organic Fibers*, Report No. 4364 of the Naval Research Laboratories, (May 25, 1954).
3M product literature for Thinsulate™ Lite Loft Insulation (1992).
Hoechst Celansese product literature for Textile Fibers (Mar. 1991).
ASTM Designation F778–88, *Standard Methods for Gas Flow Resistance Testing of Filtration Media* (1988).

*Primary Examiner*—Khanh Dang
*Attorney, Agent, or Firm*—Karl G. Hanson; Carol Truesdale

[57] ABSTRACT

Noise is attenuated through use of an acoustical insulation 10 that includes a molded, three-dimensional nonwoven web that contains organic microfibers 12 and heat activatable staple fibers 14 where the heat activatable staple fibers 14 are bonded to each other and to the microfibers 12 at various contact points. The web contains greater than 15 weight percent heat activatable staple fibers, has a thickness of about 0.5 centimeters or greater, and a density of less than 250 kilograms per cubic meter and preferably contains bulking staple fiber 16. The acoustical insulation is positioned between a source area and a receiving area such that a major face of the insulation intercepts and thereby significantly attenuates sound waves passing from the source area to the receiving area.

40 Claims, 3 Drawing Sheets

METHOD OF ATTENUATING SOUND, AND ACOUSTICAL INSULATION THEREFOR

This is a continuation-in-part of provisionally filed application 60/000,467 filed Jun. 23, 1995.

TECHNICAL FIELD

This invention pertains to a method of attenuating sound using an acoustical insulation that contains organic microfibers and heat activatable staple fibers.

BACKGROUND

Many acoustical articles have been developed to offset the unpleasant attributes of noise pollution. Known sound-absorbing materials frequently come in the form of panels or laminates—see for example, U.S. Pat. Nos. 4,420,526, 4,828.910, 4,851,283, and 5,298,694—and may be useful, as indicated in these patents, for attenuating sound in motor vehicles, and may also be useful in other devices including, airplanes, trains, appliances such as air conditioners and dishwashers, and commercial or residential structures.

U.S. Pat. No. 5,298,694 to Thompson and Stroh discloses an acoustical insulation that has particularly good sound absorption properties and is relatively light in weight. This acoustical insulation includes a nonwoven web of thermoplastic fibers that have an effective fiber diameter less than 15 microns. The web may be formed from very fine denier staple fibers, melt blown microfibers, or solution-blown microfibers. The thermoplastic nonwoven web is laminated to a second layer such as a scrim, nonwoven fabric, film, or foil to provide the insulation with sufficient structural integrity. In one aspect, Thompson and Stroh represents an advance in the art through their discovery that exceptional sound absorption can be obtained by webs that contain melt blown microfibers and staple fibers.

In U.S. Pat. No. 3,016,599 to Perry, another nonwoven fibrous product is disclosed that contains microfiber and staple fiber. Perry does not indicate that this product is suitable for acoustical applications, however. Rather, the patent discloses that the microfiber and staple fiber batt can be pressed into a sheetlike structure to filter particles (column 3, lines 41–59).

U.S. Pat. No. 4,118,531 to Hauser discloses a nonwoven web that contains microfibers and crimped bulking fibers. The fibers are randomly and thoroughly intermixed and intertangled with one another to form a resiliently compressible fiber structure that has a loft of at least 30 cubic centimeters per gram. Hauser's web is used as thermal insulation.

SUMMARY OF THE INVENTION

The present invention provides a method for attenuating sound waves that pass from a source area to a receiving area. The method comprises positioning an acoustical insulation—that comprises a molded three-dimensional nonwoven web of organic microfibers and 15 weight percent or greater heat activatable staple fibers, the latter of which are bonded to themselves and to the microfibers at various contact points—between a source area and a receiving area such that a major face of the insulation intercepts and thereby significantly attenuates sound waves passing from the source area to the receiving area. The nonwoven web has a thickness of at least 0.5 centimeters or greater and has a density of less than 250 kilograms per cubic meter.

The present invention also provides an acoustical insulation that comprises a nonwoven fibrous web that contains organic microfibers, heat activatable staple fibers, and bulking staple fibers. The heat activatable staple fibers are bonded to each other and to the other fibers at points of contact. The acoustical insulation is beneficial because it can be furnished in various molded shapes while retaining good flexural strength.

The invention differs from known methods of attenuating sound in that a nonwoven web is used that contains heat activatable staple fibers bonded to organic microfibers such that the web has a thickness of 0.5 centimeters or greater and has a density of less than 250 kilograms per cubic meter. The present invention is an advance over known acoustical insulation in that it can possess sufficient structural integrity without use of a second layer such as a scrim, nonwoven fabric, film, or foil. The inventors discovered that by adding heat activatable staple fibers to a web containing organic microfibers that the resulting article could be molded into a variety of shapes while retaining exceptional sound attenuation properties and that there would be no need for a second layer to preserve the insulation's structural integrity. Further, the inventors discovered that by adding an appropriate amount of high denier bulking staple fibers that superior sound attenuation is achieved while also obtaining good flexural strength.

These and other advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

DETAILED DESCRIPTION OF THE PREFERRED EMBODIMENTS

In the practice of the present invention, a method of attenuating sound is provided using an acoustical insulation that contains a molded, three-dimensional nonwoven web that contains organic microfiber and 15 weight percent or greater heat-activatable staple fibers, where the heat activatable staple fibers are bonded to each other and are also bonded to the organic microfiber. The web used in the method has a thickness of 0.5 centimeters or greater and a density of less than 250 kilograms per cubic meter and preferably includes bulking staple fiber.

Figure 1:
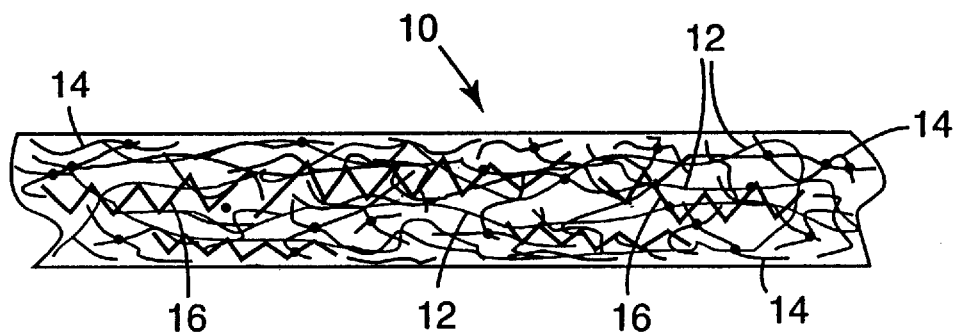
FIG. 1 is a cross-section of an acoustical insulation web 10 in accordance with the invention.

FIG. 1 illustrates a portion of an acoustical insulation 10 according to the invention. As shown, the acoustical insulation 10 includes a nonwoven web that contains organic microfibers 12, heat activatable staple fibers 14, and optional bulking staple fibers 16. The heat activatable staple fibers 14 are bonded to each other and are also bonded to the organic microfibers 12 and to the bulking staple fibers at various contact points.

Figures 2A, 2B:
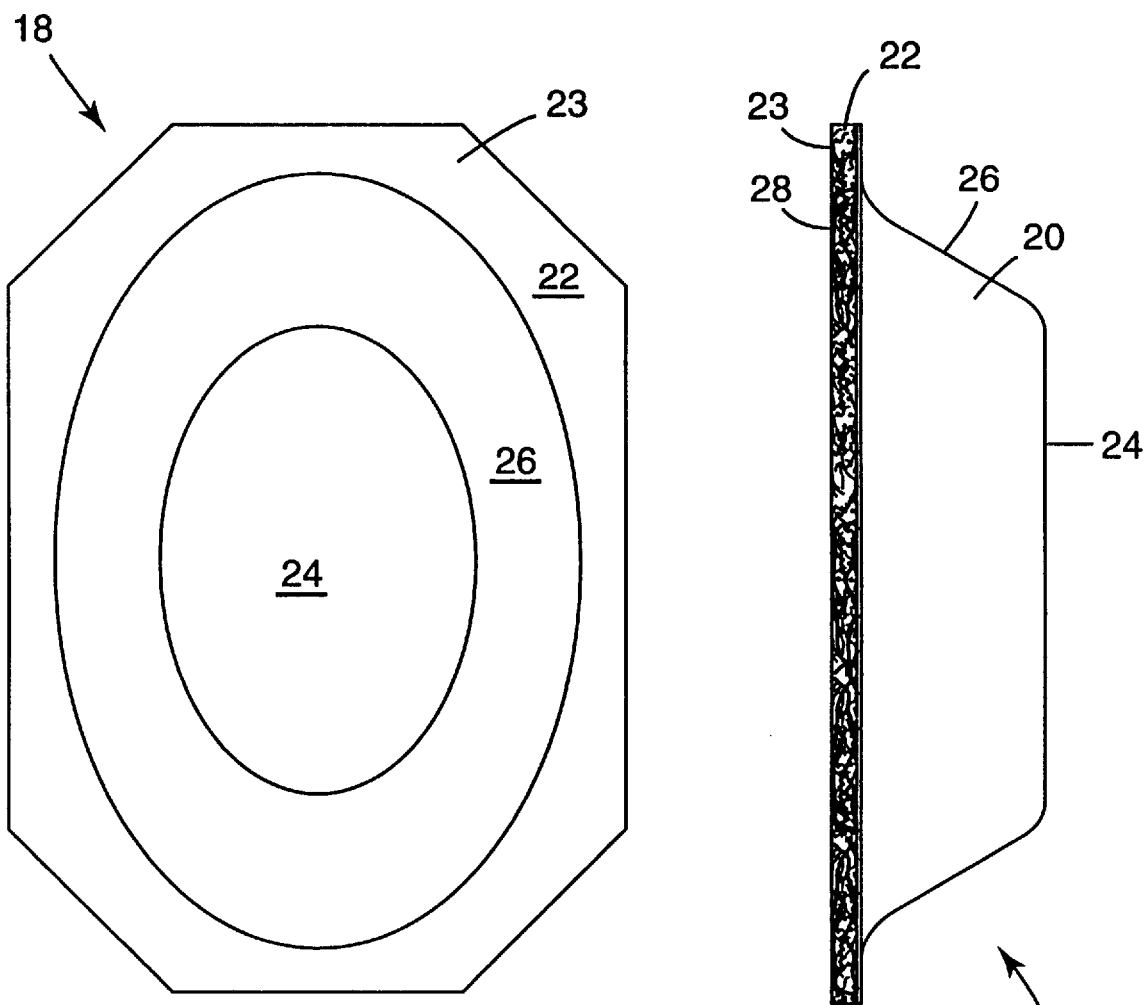
FIG. 2a is a front view of a molded speaker encasement 18 in accordance with the invention.
FIG. 2b is a side view of the molded speaker encasement 18 of FIG. 2.

The acoustical insulation may be furnished in a variety of shapes and configurations, including molded three dimensional articles, an example of which is illustrated in FIGS. 2a and 2b.

FIGS. 2a and 2b show a speaker encasement 18 that is formed from organic microfibers, heat-activatable staple fibers, and optional bulking staple fibers, where the heat activatable staple fibers are bonded to each other and to the other fibers in the web. Molded acoustical insulation articles of the invention, such as speaker encasement 18, have sufficient structural integrity by themselves so that there is no need to juxtapose a scrim, fabric, foil, or other laminate to the nonwoven web to ensure the article's structural integrity. The bonding of the heat activatable staple fibers to each other and to other fibers in the web allows molded acoustical articles to be provided in a variety of three dimensional configurations without hampering the web's acoustical properties.

Speaker encasement 18 includes a bowl portion 20 and a flange portion 22. Bowl portion 20 has a back surface 24 that is disposed in a spaced relationship from a flange portion 22. Bowl portion 20 includes a side wall 26 that is located between the flange portion 22 and the back surface 24. The flange 22 has a generally planar front surface 23 that would be disposed towards a surface onto which the speaker encasement 18 is mounted. Flange portion 22 may possess openings (not shown) to allow speaker encasement 18 to be secured to such a surface. When in use, a speaker's magnet and cone (not shown) are disposed substantially to be within the bowl portion 20. The speaker may also have flange portions to allow it to be secured to the same surface as the speaker encasement.

Figure 3:
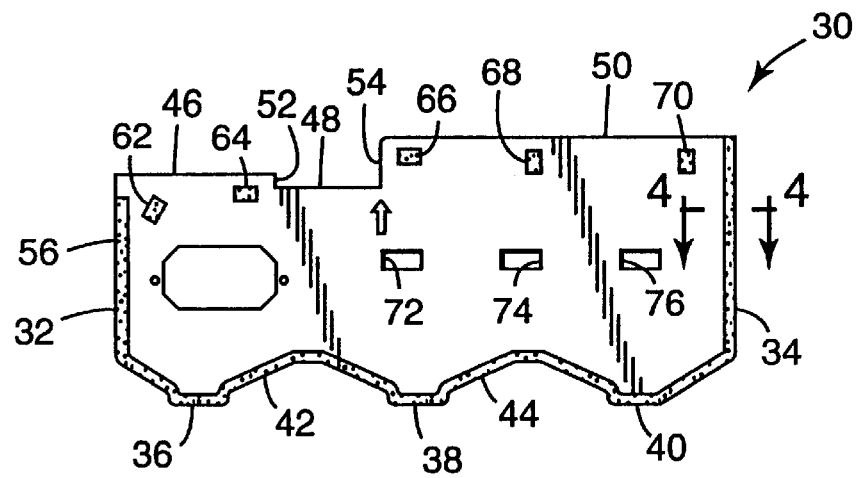
FIG. 3 is a side view of a molded door panel 30 in accordance with the invention.

In FIG. 3 a molded acoustical door panel 30 is shown that includes generally spaced, parallel side edges 32 and 34. The bottom edge is somewhat scallop-shaped and includes three aligned and spaced-apart bottom edge portions 36, 38, and 40 joined by inwardly extending edge portions 42 and 44. The top edge of the molded acoustical door panel 30 is defined by generally parallel and vertically offset top edge portions 46, 48, and 50. Vertical edge portions 52 and 54, respectively, join the top edge portion 46 to the top edge portion 48 and the top edge portion 48 to the top edge portion 50.

To allow the molded acoustical door panel 30 to be attached to the vehicle door, the door panel 30 can have an adhesive layer 56 that is applied to selected areas, typically after the panel has been molded into its desired configuration. The adhesive layer 56 may be applied by known techniques in either continuous or discontinuous patterns, and typically has a relatively uniform thickness that is significantly less than the thickness of the door panel 30. Many different adhesives may be used, but they preferably have substantially permanently tacky, pressure-sensitive characteristics. In the illustrated embodiment, the adhesive layer 56 is applied in a relatively narrow band that extends continuously along the vertical side edges 32, 34 and completely across the bottom edge, and is typically applied to reduced thickness areas 60 (FIG. 4) of the molded door panel 30. In addition, spaced apart generally rectangular, adhesive areas may be applied to the door panel 30 adjacent to its top edge as shown, for example, at areas 62, 64, 66, 68, and 70.

Typically, the adhesive layer 56 is applied and is at least partially cured before the door panel 30 is cut to its final configuration. The door panels 30 customarily are in a blank form before the cutting operation, and they preferably are processed as necessary and appropriate to at least partially cure the adhesive. This places the adhesive of each door panel in its substantially permanently tacky condition for obtaining the required pressure-sensitive characteristics. Any necessary internal openings or apertures such as openings 72, 74, and 76, can be cut through the blanks as necessary to provide access to predetermined areas.

Figure 4:
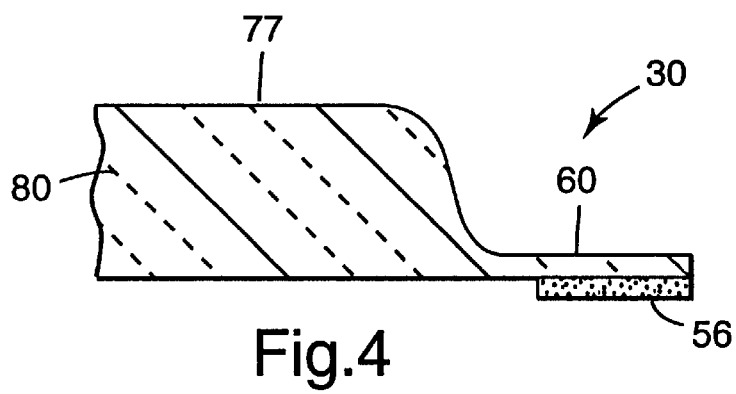
FIG. 4 is an enlarged diagrammatical cross-section of the door panel 30 taken along lines 4—4 of FIG. 3.
Figure 5:
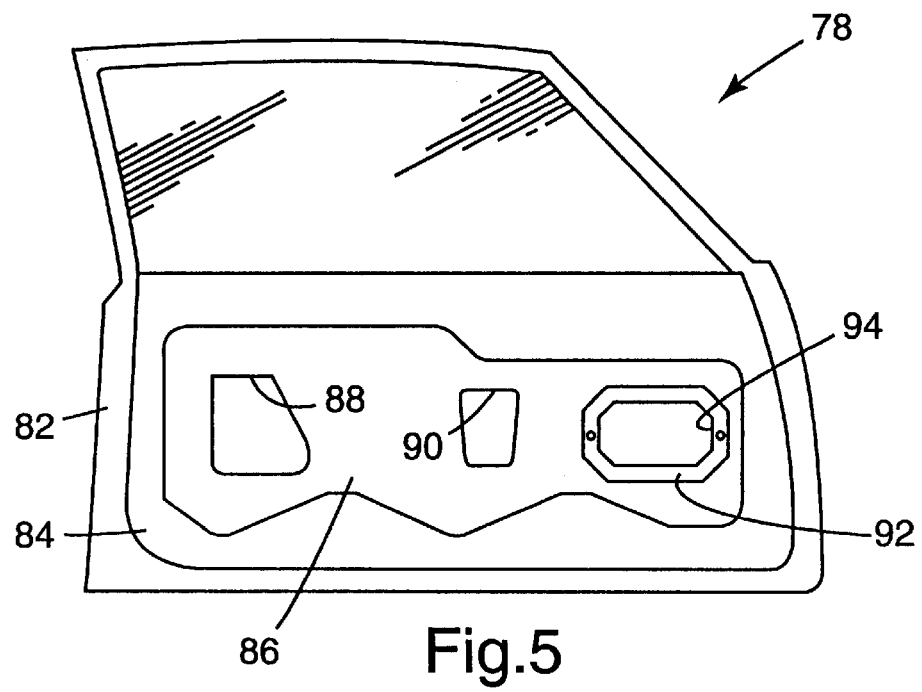
FIG. 5 is a diagrammatical elevational view of an inner panel 84 of a vehicle door 78.

FIG. 5 illustrates an example of a vehicle door 78 into which a molded acoustical door panel 30 (FIG. 3) may be placed. The molded door panel, as indicated, provides sound attenuation for a vehicle door and may, if desired, also contain a liquid impermeable layer (not shown) to prevent water from entering a vehicle's interior. The molded acoustical door panel is secured to a vehicle door to attenuate sound waves that contact a major face of the door panel's nonwoven web 80 (FIG. 4). The door panel hampers the sound passage from a source area (for example, vehicle tires or wind noise) to a receiving area (for example, vehicle interior). A liquid impermeable layer may prevent water passage through the door panel into the vehicle's interior.

The vehicle door 78 shown in FIG. 5 is generally conventional and has an outer panel 82. An inner panel 84 is suitably secured to the outer panel 82 such as by welding along the peripheral edge of the inner panel 84. Typically, the panels are spaced to provide an internal chamber for accommodating various internal window operating mechanisms. For this reason, the inner panel 84 is generally formed to have an uneven shape or contour for accommodating and mounting various accessories. In the illustrated embodiment, the inner panel 84 has an inwardly dished-in or recessed area 86 with openings 88 and 90. The openings 88 and 90 provide access to the various internal door mechanisms. In the illustrated embodiment, the inner panel 84 also includes a generally hexagonally shaped portion 92 extending upwardly from the bottom of the recessed area and having a surface lying at an elevation generally in the plane of the outer panel 82. An opening 94 is formed through the inner panel's recessed area 86, centrally in the hexagonally shaped portion 92. Such openings are often provided to permit installation of in-door ashtrays, radio speakers, et cetera. In the illustrated embodiment, the opening 94 is designed to permit a speaker to be mounted to the inner panel 84 such that the speaker's cone and magnet extend inwardly into the door's interior.

Figure 6:
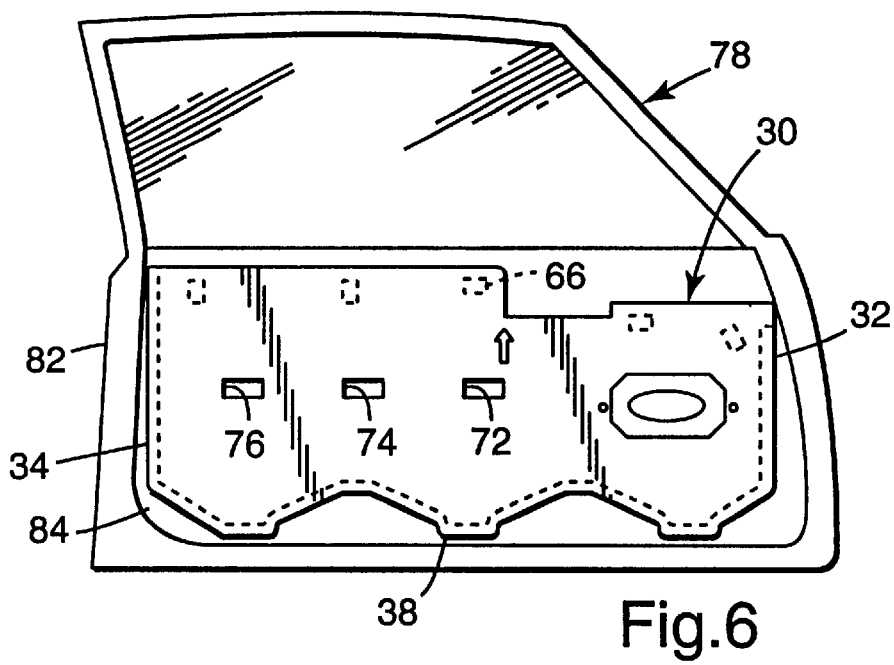
FIG. 6 is a view similar to FIG. 2 but showing the molded door panel 30 in position on the inner panel 84 of the vehicle door 78.

FIG. 6 illustrates a molded acoustical door panel 30 in its installed position on the door 78. The molded acoustical door panel 30, as previously mentioned, is typically shaped and contoured to overlie the area of the inner panel 84. In some embodiments, a generally flat door panel can function adequately to provide acoustical insulation. In certain circumstances, however, discontinuities in the inner panel's surface make it desirable that the molded acoustical door panel 30 is formed with bulges or pockets to accommodate the discontinuities and/or to provide space for various door mechanisms or structures. For example, in this embodiment the molded acoustical door panel 30 may have an integrally formed encasement (that is, formed from the same web as the door panel) that extends into the speaker mounting opening 94 to accommodate the speaker's magnet and cone to prevent sound from reverberating throughout the door's interior. Alternatively, a speaker encasement may be molded separately (FIGS. 2a and 2b), rather than integral with, the door panel 30.

The bonded nonwoven fibrous webs that are used in the acoustical insulation generally have a thickness greater than about 0.5 centimeters (cm) and typically are about 0.75 to 20 cm, more typically about 1 to 10 cm thick, and still more typically about 2 to 5 cm thick. Thickness may be determined in accordance with standardized test ASTM D1777-64 using 0.002 pounds per square inch and a 12 inch by 12 inch presser foot.

The density of the molded nonwoven webs generally is about 6 to 200 kilograms per cubic meter (kg/m³). Preferably, the density is about 10 to 100 kg/m³, and more preferably is about 15 to 30 kg/m³. Web density may be determined by measuring the basis weight as described below followed by dividing that figure by the corresponding web thickness.

The bonded nonwoven fibrous webs that are used in the acoustical insulation of the invention preferably have a flexural strength of about 1 to 40 pounds per square inch (psi; $6.9 \times 10^{-3}$ to $2.8 \times 10^{-1}$ mega Pascals (MPa)). Flexural strength may be determined in accordance with standardized test ASTM C 203-92 using Method I, Procedure A, but using a crosshead speed of 0.5 inches per minute (1.27 cm per minute). Preferred nonwoven webs have a flexural strength of about 5 to 20 psi ($3.5 \times 10^{-2}$ to $1.4 \times 10^{-1}$ MPa), and more preferred webs have a flexural strength of about 10 to 15 psi ($6.9 \times 10^{-2}$ to $1 \times 10^{-1}$ MPa).

Suitable bonded nonwoven fibrous webs also preferably have a basis weight of about 50 to 4,000 grams per square meter (g/m²) when the staple fibers are bonded to themselves and to the other fibers. More preferably, the nonwoven webs have a basis weight of about 150 to 2,000 g/m², and still more preferably have a basis weight of 200 to 1,000 g/m². Basis weight may be determined in accordance with ASTM D 3776-85.

The air pressure drop demonstrated by the bonded nonwoven fibrous webs of the invention generally is about 0.1 to 15 mm H₂O (0.98 Pa to 147 Pa). Air pressure drop may be determined in accordance with standardized test ASTM F 778-88 using Method A. Preferably the air pressure drop is greater than about 0.2 mm H₂O (1.96 Pa), and more preferably is greater than about 0.3 mm H₂O (2.94 Pa).

The bonded nonwoven fibrous webs preferably have a percent solidity of about 0.5 to 4. The solidity is the volume of fibers per volume of web, and it is typically represented by a unitless fraction as, S, and it may be calculated using the formula:

$$S = \frac{\rho_b}{\sum_{i=1}^{n} x_i \rho_i}$$

where:

$P_b$ is the bulk density of the web, which is the weight of the web divided by the volume of the web;

$x_i$ is the weight fraction of component i;

$p_i$ is the density of component i; and n is the number of components.

Preferably the bonded fibrous nonwoven webs have a percent solidity of 0.5 to 4, more preferably of 1 to 3, and still more preferably of 1.5 to 2.5.

The bonded fibrous nonwoven webs preferably have an average effective fiber diameter of about 2 to 20 micrometers ($\mu$m), more preferably about 5 to 17 $\mu$m, and still preferably about 7 to 16 $\mu$m. The average effective fiber diameter can be estimated by measuring the pressure drop of air passing through a major face of the web and across the web as outlined in standardized test ASTM F 778-88 using Method A. The term "average effective fiber diameter" means the fiber diameter calculated according to the method set forth in Davies, C. N., "The Separation Of Airborne Dust And Particles," Institution of Mechanical Engineers, London, Proceedings 1B, 1952 using a flow rate of 32 liters per minute for a face area of 100 square centimeters (cm²) or a face velocity of 5.3 centimeters per second.

Organic microfiber that is used in the acoustical insulation is a funicularly shaped, organic based, element having a diameter less than approximately 25 micrometers.

The nonwoven webs preferably contain about 20 to 80 weight percent organic microfiber based on the fibrous material in the web. More preferably the web contains about 40 to 70 weight percent organic microfiber, and more preferably about 55 weight percent organic microfiber. The microfibers preferably are polymeric thermoplastic microfibers such as melt blown microfibers but may also be produced using solution blown techniques in which the fiber forming material is placed in liquid form by adding of a volatile solvent. When the organic microfibers are melt blown microfibers made from polypropylene (such as Fina™ 3860X) available from Fina Chemical Company, Dallas, Tex., the web preferably contains 55 weight percent organic microfiber.

Melt blown microfiber webs can be formed as described in Wente, Van A., "Superfine Thermoplastic Fibers: in *Industrial Engineering Chemistry*, Vol. 48, pages 1342 et seq. (1956) or in Report No. 4364 of the Naval Research Laboratories, published May 25, 1954, entitled "Manufacture of Superfine Organic Fibers" by Wente, Van A., Boone, C. D., and Fluharty, E. L. The aspect ratio (ratio of length to diameter) of the melt blown microfibers should approach infinity, even though melt blown microfibers are known to be discontinuous.

The melt blown microfibers are generally about 1 to 25 micrometers in diameter, preferably about 2 to 15 micrometers, more preferably about 5 to 10 micrometers.

Microfibers used in the invention may be formed from nearly any fiber-forming material. U.S. Pat. No. 4,011,067 to Carey describes useful apparatus and procedures for forming a web of such fibers. Electrostatic spinning techniques may be used such as disclosed in U.S. Pat. No. 4,069,026 to Simm et al. In preparing nonwoven webs of this invention, fiber-forming material is generally extruded through a plurality of adjacent orifices. Representative polymers useful for forming melt-blown microfibers include polyolefins such as polypropylene, polyethylene, poly(4-methylpentene-1) and polyolefin copolymers; polyesters such as polyethylene terephthalate (PET) and polybutylene terephthalate, polyether ester copolymers such as HYTREL™ available from DuPont Co., Elastomers Division, Wilmington, Del.; polyamides such as nylon 6 or nylon 66, polyurethane, polystyrene-polybutadiene-polystyrene block copolymers, and other polymers now known or later developed in the art. Combinations of the above polymeric microfibers, or blends of the polymeric components, may also be employed. For example, the nonwoven microfibrous web may contain bicomponent microfiber such as polypropylene/polyester fibers (see U.S. Pat. No. 4,547,420 to Krueger et al.). Useful polymers for forming microfibers from solution include polyvinyl chloride, acrylics, and acrylic copolymers, polystyrene, and polysolfone.

Heat activatable staple fibers suitable for use in the present invention may include: amorphous meltable fibers; adhesive coated fibers that may be discontinuously coated; and bicomponent heat activatable fibers that have a heat activatable component and a supporting component arranged in a coextensive side-by-side, concentric sheath-core, or elliptical sheath-core configuration along the length of the fiber, with the heat activatable component forming at least a portion of the outer surface of the fiber. The heat activatable component of the fibers is thermally activatable (that is meltable) at a temperature below the melt temperature of the melt blown microfibers and, when present, the bulking staple fibers of the acoustical insulation. Thus, "heat activatable staple fibers" are fibers that possess such a heat activatable component.

Heat activatable staple fibers are generally present in the web at about 15 weight percent or greater based on the fibrous material in the web. Preferably the heat activatable staple fibers are present at about 15 to 70 weight percent, and more preferably at about 30 to 50 weight percent, based on the fibrous material in the web. When a bicomponent fiber having a copolyester sheath and a polyester core (e.g. CELBOND™ 54 available from Hoechst-Celanese Company, Sommerville, N.J.) is used as the heat activatable staple fiber, it preferably is present in the nonwoven web at about 40.5 weight percent.

The amount of heat activatable staple fibers can vary widely depending on the size of the fibers, the amount of flexural strength required for the desired web, combined with the required density, solidity, average effective fiber diameter and pressure drop of the acoustical insulation material. Greater amounts of heat activatable staple fibers generally increase the flexural strength of the acoustical insulation while lesser amounts may improve acoustical properties. A range of heat activatable staple fibers are useful in the present invention. When utilized with the melt blown microfibers alone without additional staple fibers, finer denier heat activatable fibers generally provide better acoustic properties while greater amounts of the heat activatable staple fibers generally increase the flexural strength of the acoustical insulating material. The length of the heat activatable fiber is preferably about 15 mm to 75 mm, more preferably about 25 mm to 50 mm, although fibers as long as 150 mm are also useful. The size of the heat activatable fiber can vary widely but generally is in the range of 1 denier to 100 denier, preferably about 2 denier to 50 denier, most preferably about 2 denier to 15 denier.

Preferably, the heat activatable staple fibers are crimped, having 1 to 10 crimps per cm, more preferably having about 3 to 5 crimps per cm. One particularly useful heat activatable staple fiber is a crimped sheath-core bonding fiber having a core of crystalline polyethylene terephthalate surrounded by a sheath of an adhesive polymer formed from isophthalate and terephthalate esters. The sheath is heat softenable at a temperature lower than the core material. Such fibers, available as CELBOND™ fibers from Hoechst Celanese Corp., Charlotte, N.C., are particularly useful in preparing the batts of the present invention.

The inventive acoustical insulation also may contain bulking staple fibers. Bulking staple fibers are those that assist in maintaining web loft, particularly when the heat activatable staple fiber is bonded to the other fibers in the web. Heat activatable staples fibers typically cause overall web shrinkage after being sufficiently heated. Web loft is very important for maintaining sound absorption. Bulking fibers may be crimped bulking fibers like those disclosed in U.S. Pat. No. 4,118,531 to Hauser. Crimped bulking fibers have a continuous wavy, curly or jagged character along their length. The number of crimps per unit length can vary rather widely but generally is in the range of about 1 to 10 crimps per cm, preferably at least about 2 crimps per cm.

The size of the crimped bulking fiber can vary widely but generally is in the range of about 1 denier to 100 denier, preferably about 3 to 75 denier. Typically, the crimped bulking fibers have an average length of about 2 to 15 cm, preferably about 7 to 10 cm. The crimped bulking fibers can be formed from polyester, acrylics, polyolefins, polyamides, polyurethanes, rayons, acetates and mixtures thereof.

The amount of crimped bulking fibers can vary widely depending on the size of the fibers and the amount of increased bulk provided by the fibers as well as the ratio of melt blown microfibers to heat activatable staple fibers. The amount must be such that the required acoustical properties, density and average effective fiber diameter are met.

Bulking staple fibers may be present in the web at 0 to 40 weight percent, based on the fibrous material in the web. Preferably the bulking staple fibers are present at about 1 to 30 weight percent, and still more preferably at about 3 to 6 weight percent, based on the fibrous material in the web. When the bulking staple fiber is a 50 denier polyester terephthalate fiber (e.g., Fiber 53 of 3M, Saint Paul, Minn.), it preferably is added to the nonwoven web at about 4.5 weight percent. Fiber 53 has a staple length of 2.2 inches (5.6 cm) and about 5 crimps per inch (about 2 crimps per centimeter).

Any of the polymers that are used to produce the organic microfiber, the heat activatable staple fibers, and the bulking staple fibers may be made from either virgin materials or recycled polymers.

Although the inventive acoustical insulation has been described as being useful for attenuating sound in motor vehicles, particularly between the interior and the exterior, the insulation may be used in a number of other application including: large household appliances such as dishwashers, washing machines, and dryers; residential and commercial structures such as in the walls of homes and in cubicles of office partitions; airplanes such as in a dual walled cabin or between the engine and the cabin; trains such as between the passenger compartment and exterior; and in boats between the engine and passenger compartments and as a hull liner.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

EXAMPLES

Figure 7:
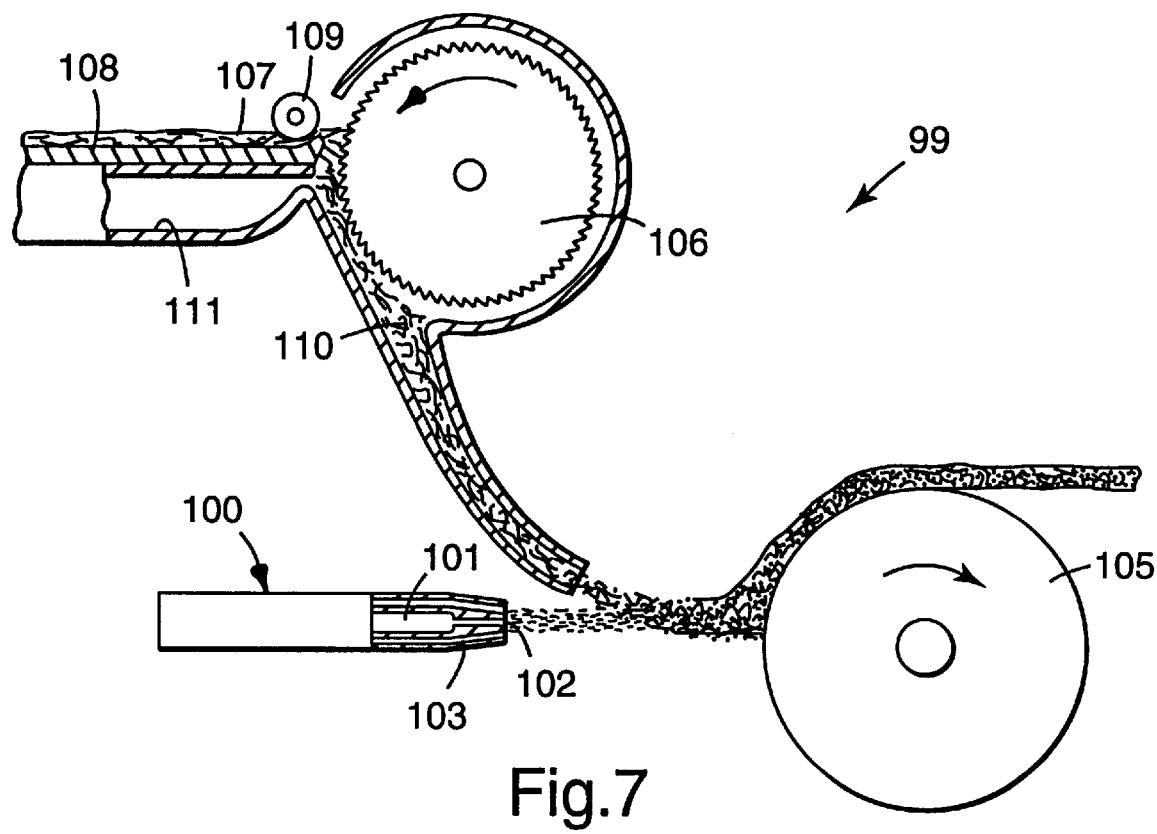
FIG. 7 is a schematic diagram of an apparatus 99 for preparing acoustical insulation of the invention.

Representative apparatus 99 useful for preparing the nonwoven acoustical insulation of the present invention is shown schematically in FIG. 7. The apparatus is similar to the apparatus disclosed in U.S. Pat. No. 4,118,531 to Hauser.

The fiber-blowing portion of the illustrated apparatus can be a conventional structure as disclosed for example in Wente, Van A. "Superfine Thermoplastic Fibers", Naval Research Laboratories, Report No. 4364, both of which are cited above. Such a structure includes a die 100 that has an extrusion chamber 101 through which liquefied fiber forming material is advanced; die orifices 102 arranged in lines across the forward end of the die and through which the fiber-forming material is extruded; and cooperating gas orifices 103 through which a gas, typically heated air, is forced at high velocity. The high-velocity gaseous stream draws out and attenuates the extruded fiber-forming material, allowing the fiber forming material to solidify as the fiber travels to a forming surface of a collector. The aspect ratio (ratio of length to diameter) of the microfibers should approach infinity, though melt blown microfibers are known to be discontinuous.

The forming surface of the collector typically is a perforated drum 105 that includes a finely perforated screen. The collector, however, also could be a fabric, wire, film, rubber, et cetera. The collector surface should be at least as wide as the die face portion containing orifices. The collector surface is substantially parallel to the die, that is, one end of the collector surface is angled no more than about 60° from the die than the other end. The collector surface is about 0.3 to 1 m from the die, more preferably about 0.38 to 0.64 m. A gas-withdrawal apparatus (not shown) may be positioned behind the screen to assist in depositing the fibers and removing the high-velocity gas stream. The nonwoven web may also be formed on a layer of scrim material, a nonwoven, or a film that is positioned on the collector.

To incorporate the heat activatable staple fibers into the acoustical insulation web, they are introduced into the stream of blown microfibers in the illustrative apparatus shown in FIG. 7 through the use of a lickerin roll 106 disposed above the microfiber-blowing apparatus. A batt 107 of heat activatable fiber is propelled along a chute 108 under a drive roll 109 where the leading edge of the nonwoven supply engages against the lickerin roll 106. The lickerin roll turns in the direction of the arrow and picks off fibers from the leading edge of the source 107, separating the fibers from one another. The separated fibers are conveyed in an air stream through an inclined trough or duct 110 and into the stream of blown microfibers where they become mixed with the blown microfibers. The air stream is generated inherently by rotation of the lickerin roll, or that air stream may be augmented by use of an auxiliary fan or blower operating through a duct 111 as known in the art.

When bulking fibers are employed, they are introduced into the stream of blown microfibers using the apparatus shown in FIG. 7 in a manner similar to the heat activatable staple fibers by incorporating the bulking fibers onto batt 107 and driving the batt 107 into the lickerin roll 106 disposed above the microfiber-blowing apparatus 100. The batt 107 may be prepared from bale using conventional fiber opening equipment or prepared on a garnet machine or RANDO-WEBER. An air stream, provided through duct 110, serves to remove the separated fibers from the lickerin teeth and then feed the separated fibers into the base stream of blown microfibers. The fibers are mixed by the air turbulence and travel to the collector 105 where the fibers form a web of randomly intermixed, intertangled fibers.

The collected fibrous web is then formed to the desired basis weight, thickness, and solidity. The distance between the die and the collector affects web solidity, thickness, and web density. The web is subsequently formed into the desired shape and heated sufficiently to effect interfiber bonding by the heat activatable staple fibers with other heat activatable fibers and with the melt blown microfibers and, when present with the bulking staple fibers at point of contact to form the acoustical insulating product. The temperature to which the web is heated is preferably about 40° C. to 70° C. above the temperature at which the heat activatable portion of the heat activatable fiber melts. Alternatively, the web can be heated to about 40° C. to 70° C. above the temperature at which the heat activatable portion of the heat activatable fiber melts, followed by placing the web into a mold for forming the desired structure and allowing the web to cool to form the resultant acoustical insulation material. Or the web can be placed in a mold that is subsequently heated to the noted temperatures.

EXAMPLES 1–5

In Examples 1–5, bonded fibrous nonwoven webs were prepared according to the method described above. The webs comprised organic melt blown microfibers (MB) prepared from FINA™ 3860X polypropylene resin blown from a die to a collector at a distance of 38 cm (15 inches). The webs also comprised CELBOND™ K54 heat activatable staple fibers (HAF) 1.5 cm long and having the denier set forth in Table 1. The prepared webs were annealed in a conveyor oven at about 150° C. (300° F.) at a line speed of about 1.8 meters per minute (6 feet/minute) to provide acoustic insulation of the invention. The basis weight, web thickness, airflow resistance, and average effective fiber diameter was determined as described above. The compositions of the webs are set forth in Table 1.

TABLE 1

| Example Number | Web Content MB/HAF (parts) | Denier of Heat Activatable Fiber | Basis Weight (g/m$^2$) | Web Thickness (cm) | Web Density (kg/m$^3$) | Web Solidity | ΔP @ 32 L/min (mm H$_2$O) | Effective Fiber Diameter (microns) |
|---|---|---|---|---|---|---|---|---|
| 1 | 70/30 | 2 | 270 | 0.94 | 28.72 | 2.76 | 2.35 | 12 |
| 2 | 40/60 | 2 | 282 | 1.17 | 24.11 | 2.05 | 1.61 | 14.1 |
| 3 | 55/45 | 4 | 220 | 0.99 | 22.34 | 2.02 | 1.44 | 13 |
| 4 | 70/30 | 15 | 230 | 0.69 | 33.29 | 3.19 | 1.67 | 13.6 |
| 5 | 40/60 | 15 | 170 | 0.59 | 28.88 | 2.46 | 1.04 | 14.3 |

The samples described in Table 1 were then tested for sound absorption according to ASTM Test Method E-1050.

The webs also were double layered to provide a targeted web basis weight of 400 g/m$^2$. The samples were cut into 1 foot square sections and were placed in an oven for 3 minutes at a temperature of 163° C. (325° F.). Each web was removed from the oven and placed between two plates gapped at 12.7 mm. A pressure of 0.28 psi was applied to the web for 1 minute. The quenched samples were subsequently removed from the compression apparatus. The double layered samples were tested for flexural strength according to ASTM Test Method C203-93. The results are summarized in Table 2.

TABLE 2

| Example Number | Web Content MB/HAF (parts) | Denier of HAF Fiber | Flexural Strength (psi) | Percent Sound Absorption at Selected Frequencies ||||||||
|---|---|---|---|---|---|---|---|---|---|---|---|
| | | | | 250 Hz | 500 Hz | 1 kHz | 2 kHz | 3.2 kHz | 4 kHz | 5 kHz | 6.3 kHz |
| 1 | 70/30 | 2 | 5.5 | 3.5 | 6.3 | 13.7 | 35.3 | 60.1 | 74 | 85.1 | 92.6 |
| 2 | 40/60 | 2 | 13.7 | 4.1 | 7.3 | 15.5 | 37.9 | 63.2 | 77 | 87.7 | 93.5 |
| 3 | 55/45 | 4 | 13.6 | 2.6 | 6.4 | 15.3 | 34.6 | 59 | 72.9 | 84.9 | 92 |
| 4 | 70/30 | 15 | 5.1 | 3.4 | 5.7 | 10.4 | 23.9 | 42.4 | 55.9 | 68.4 | 78.9 |
| 5 | 40/60 | 15 | 4.5 | 3.1 | 4.7 | 6.9 | 14.2 | 24.9 | 33.2 | 41.8 | 51.1 |

The results demonstrate that acoustical insulation of the invention can have a low effective fiber diameter and good web loft while achieving very acceptable sound absorption properties, and imparting significant flexural strength. It is believed that the combination of having fine denier HAF gives both benefit of more interfiber bonding while maintaining openness to the structure to attenuate sound waves and dissipate as heat energy.

EXAMPLES 6–18

In Examples 6–14 and 18, and Comparative Example C1, acoustical insulation was prepared as described above. Examples 15–17 varied in that the webs were formed using a 43 cm (17 inches) die collector distance. The webs comprised organic melt blown microfibers ("MB") prepared from FINA™ 3860X melt flow 100 polypropylene resin available using the die to collector distance of 38 cm (15 inches). The webs also comprised 1.5 cm long CEL-BOND™ K54 heat activatable staple fibers ("HAF") having the denier set forth in Table 3. The webs further comprised crimped bulking fibers in the form of 1.5 inch (3.8 cm) long, polyester staple fibers having 10/crimps/inch (3.9 crimps/cm) having the denier set forth in Table 3 (available as Type T-295 fibers from Hoechst-Celanese Co.). The webs were subsequently annealed in a conveyor oven at about 150° C. (300° F.) at a line speed of 1.8 meters per minute (6 ft/min) to provide acoustic insulation material. Table 3 summarizes the web content, fiber denier, basis weight, thickness, web density, web solidity, and effective fiber diameter (EFD) for each sample.

TABLE 3

| Example Number | Web Content MB/HAF/SF (parts) | Denier of HAF/SF | Basis Weight (g/m2) | Web Thickness (cm) | Web Density (kg/m3) | Web Solidity | ΔP @ 32 l/min (mm H$_2$O) | Effective Fiber Diameter (microns) |
|---|---|---|---|---|---|---|---|---|
| 6 | 70/15/15 | 2/6 | 226 | 1.31 | 16.41 | 1.66 | 1.41 | 12.3 |
| 7 | 40/30/30 | 2/6 | 211 | 1.86 | 11.36 | 0.97 | 0.68 | 15.6 |
| 8 | 55/34/11 | 2/6 | 218 | 1.29 | 16.93 | 1.53 | 1.25 | 12.9 |
| 9 | 80/15/5 | 4/6 | 249 | 0.92 | 27.01 | 2.71 | 2.2 | 11.7 |
| 10 | 70/23/7 | 4/6 | 224 | 0.81 | 27.76 | 2.66 | 1.88 | 12.1 |
| 11 | 55/34/11 | 4/6 | 223 | 1.31 | 17.02 | 1.54 | 1.03 | 14.4 |
| 12 | 70/15/15 | 15/6 | 239 | 1.38 | 17.34 | 1.66 | 1.24 | 13.7 |
| 13 | 40/30/30 | 15/6 | 215 | 1.7 | 12.63 | 1.08 | 0.59 | 17.3 |
| 14 | 55/34/11 | 15/6 | 220 | 1.01 | 21.89 | 1.98 | 1.17 | 14.3 |
| 15 | 55/40/5 | 2/3 | 204 | 0.99 | 20.61 | 2 | 1.53 | 11 |
| 16 | 55/40/5 | 2/15 | 230 | 1.24 | 18.55 | 1.73 | 0.9 | 14.1 |
| 17 | 55/40/5 | 2/50 | 240 | 1.3 | 18.46 | 1.77 | 1.27 | 12.6 |
| 18 | 20/72/8 | 2/50 | 274 | 1.01 | 27.13 | 2.6 | 1.4 | 20.0 |
| C1 | 55/0/45 | 0/6 | 214 | 1.63 | 13.13 | 1.18 | 0.9 | 14.1 |

The acoustical insulation set forth in Table 3 was evaluated for percent sound absorption and flexural strength as described above. The results are shown below in Table 4.

TABLE 4

| Example Number | Web Content MB/HAF/SF (parts) | Denier of HAF/SF | Flexural Strength (psi) | Percent Sound Absorption at Selected Frequencies ||||||||
|---|---|---|---|---|---|---|---|---|---|---|---|
| | | | | 250 Hz | 500 Hz | 1 kHz | 2 kHz | 3.2 kHz | 4 kHz | 5 kHz | 6.3 kHz |
| 6 | 70/15/15 | 2/6 | 3.8 | 3.8 | 7.9 | 16.5 | 38.8 | 64.2 | 77.9 | 87.4 | 92 |
| 7 | 40/30/30 | 2/6 | 4.3 | 5.6 | 9.5 | 17.3 | 36.8 | 59.3 | 70.4 | 77.5 | 79.3 |
| 8 | 55/34/11 | 2/6 | 6.6 | 3.6 | 8.5 | 18.9 | 42.0 | 67.6 | 79.6 | 87.8 | 91.5 |
| 9 | 80/15/5 | 4/6 | 5.2 | 1.9 | 6.4 | 16.2 | 37.9 | 63.8 | 77.8 | 88.6 | 94.3 |
| 10 | 70/23/7 | 4/6 | 4.7 | 1.9 | 5.8 | 14.2 | 30.5 | 52.1 | 66.2 | 78.9 | 87.4 |
| 11 | 55/34/11 | 4/6 | 5.9 | 4.0 | 7.4 | 14.3 | 32.1 | 54.6 | 68.1 | 78.7 | 84.9 |

TABLE 4-continued

| Example Number | Web Content MB/HAF/SF (parts) | Denier of HAF/SF | Flexural Strength (psi) | Percent Sound Absorption at Selected Frequencies | | | | | | | |
|---|---|---|---|---|---|---|---|---|---|---|---|
| | | | | 250 Hz | 500 Hz | 1 kHz | 2 kHz | 3.2 kHz | 4 kHz | 5 kHz | 6.3 kHz |
| 12 | 70/15/15 | 15/6 | 3.8 | 4.8 | 8.4 | 16.7 | 38.8 | 63.9 | 76.7 | 85.5 | 89.3 |
| 13 | 40/30/30 | 15/6 | 3.2 | 5.5 | 8.6 | 14.4 | 30.7 | 51.1 | 61.9 | 70.1 | 73.2 |
| 14 | 55/34/11 | 15/6 | 5.2 | 3.6 | 7.2 | 15.7 | 33.6 | 56.7 | 69.8 | 80.8 | 87.2 |
| 15 | 55/40/5 | 2/3 | 5.9 | 2.8 | 5.3 | 11.8 | 25.8 | 42.8 | 55.4 | 68.5 | 77.2 |
| 16 | 55/40/5 | 2/15 | 6.5 | 3.5 | 7.4 | 15.5 | 34.1 | 54.3 | 67.5 | 78.8 | 84.9 |
| 17 | 55/40/5 | 2/50 | 8.9 | 3.4 | 7.0 | 16.2 | 37.3 | 59.2 | 72.9 | 83.6 | 88.9 |
| 18 | 20/72/8 | 2/50 | 5.3 | 3.0 | 6.0 | 12.0 | 22.0 | 37.0 | 48.0 | 59.0 | 67.0 |
| C1 | 55/0/45 | 0/6 | 2.5 | 4.1 | 9.5 | 20.8 | 47.3 | 73.4 | 83.4 | 87.7 | 87.3 |

The data in Table 4 illustrate that the acoustical insulation's flexural strength and moldability was increased by increasing the amount of fine denier HAF while maintaining sound absorption performance at both high and low frequencies. Inclusion of low amounts of high denier staple bulking fiber provided extraordinary sound absorption while maintaining good flexural strength properties.

The effect of varying the web density of the acoustical insulation was then evaluated by testing webs of Examples 15 and 17. The webs were double layered to provide a targeted web basis weight of 400 g/m2. The samples were cut into 1 foot square sections and were placed in an oven for 3 minutes at a temperature of 163° C. (325° F.). Each web was removed from the oven and placed between two plates with gapping spacers in order to vary the resultant molded web density. A pressure of 0.28 psi was applied to the web for 1 minute. The quenched samples were subsequently removed from the compression apparatus. The samples were tested for flexural strength according to ASTM Test Method C203-93 and tested for sound absorption according to ASTM Test Method E-1050. The results are summarized in Table 5.

TABLE 5

| Example No. | Web Content MB/HAF/SF (parts) | Denier of HAF/SF | Molded Web Density (kg/m³) | Flexural Strength (psi) | Percent Sound Absorption at Selected Frequencies | | | |
|---|---|---|---|---|---|---|---|---|
| | | | | | 500 Hz | 1 kHz | 2 kHz | 4 kHz |
| 15 | 55/40/5 | 2/3 | 17.49 | 4.1 | 10 | 29 | 65 | 97 |
| 15 | 55/40/5 | 2/3 | 27.22 | 5.0 | 12 | 28 | 60 | 95 |
| 15 | 55/40/5 | 2/3 | 36.06 | 5.6 | 7 | 17 | 47 | 85 |
| 15 | 55/40/5 | 2/3 | 90.61 | 31.8 | 4 | 8 | 24 | 54 |
| 17 | 55/40/5 | 2/50 | 20.16 | 4.0 | 14 | 40 | 82 | 100 |
| 17 | 55/40/5 | 2/50 | 27.65 | 6.5 | 13 | 32 | 72 | 97 |
| 17 | 55/40/5 | 2/50 | 44.72 | 9.7 | 8 | 17 | 46 | 85 |
| 17 | 55/40/5 | 2/50 | 108.70 | 29.3 | 4 | 8 | 20 | 49 |

Good sound absorption values and good flexural strength are achieved for these particular molded acoustical insulations at web densities less than about 50 kg/m³. By utilizing higher denier staple fiber at low concentration, greater molded flexural strength and higher sound absorption properties were imparted to the molded construction.

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein. All of the above-cited United States Patents and Patent Applications are incorporated by reference herein in their entirety.

What is claimed is:

1. A method of attenuating sound, which method comprises:
    (a) providing an acoustical insulation that includes a molded, three-dimensional nonwoven web that contains organic microfibers and 15 weight percent or greater heat activatable staple fibers, the heat activatable staple fibers being bonded to each other and to the microfibers at various contact points, and the nonwoven web having a thickness of 0.5 centimeters or greater and a density of less than 250 kilograms per cubic meter; and
    (b) positioning the acoustical insulation between a source area and a receiving area such that a major face of the insulation intercepts and thereby significantly attenuates sound waves passing from the source area to the receiving area.

2. The method of claim 1, wherein the nonwoven web further comprises bulking staple fibers.

3. The method of claim 1, wherein the nonwoven web is 0.75 to 20 centimeters thick.

4. The method of claim 3, wherein the nonwoven web is 1 to 10 centimeters thick.

5. The method of claim 4, wherein the nonwoven is 2 to 5 centimeters thick.

6. The method of claim 1, wherein the nonwoven web has a density of about 6 to 200 kilograms per cubic meter.

7. The method of claim 6, wherein the density is about 10 to 100 kilograms per cubic meter.

8. The method of claim 7, wherein the density is 15 to 30 kilograms per cubic meter.

9. The method of claim 1, wherein the nonwoven web has a flexural strength of 1 to 40 pounds per square inch.

10. The method of claim 9, wherein the nonwoven web has a flexural strength of 5 to 20 pounds per square inch.

11. The method of claim 10, wherein the nonwoven web has a flexural strength of 10 to 15 pounds per square inch.

12. The method of claim 1, wherein the nonwoven web has a basis weight of 50 to 4,000 grams per square meter.

13. The method of claim 12, wherein the nonwoven web has a basis weight of 150 to 2,000 grams per square meter.

14. The method of claim 13, wherein the nonwoven web has a basis weight of 200 to 1,000 grams per square meter.

15. The method of claim 1, wherein the nonwoven web demonstrates an air pressure drop of 0.1 to 15 milimeters $H_2O$.

16. The method of claim 1, wherein the nonwoven web demonstrates an air pressure drop greater than 0.2 milimeters $H_2O$.

17. The method of claim 16, wherein the nonwoven web demonstrates a pressure drop greater than 0.3 milimeters $H_2O$.

18. The method of claim 8, wherein the nonwoven web has a percent solidity of 0.5 to 4.

19. The method of claim 8, wherein the nonwoven web has a percent solidity of 1 to 3.

20. The method of claim 19, wherein the nonwoven web has a percent solidity of 1.5 to 2.5.

21. The method of claim 1, wherein the nonwoven web has an average effective fiber diameter of 2 to 20 micrometers.

22. The method of claim 21, wherein the nonwoven web has an average effective fiber diameter of 5 to 17 micrometers.

23. The method of claim 22, wherein the nonwoven web has an average effective fiber diameter of 7 to 16 micrometers.

24. The method of claim 1, wherein the nonwoven web contains 10 to 99 weight percent organic microfiber and 1 to 90 weight percent heat activatable staple fibers, based on the weight of the fibrous material in the web.

25. The method of claim 2, wherein the nonwoven web contains 15 to 98 weight percent organic microfiber, 20 to 70 weight percent heat activatable staple fibers, and 1 to 30 weight percent bulking staple fibers, based on the weight of the fibrous material in the web.

26. The method of claim 25, wherein the nonwoven web contains 20 to 70 weight percent organic microfiber, 30 to 50 weight percent heat activatable crimped staple fibers, and 3 to 6 weight percent crimped bulking staple fibers.

27. The nonwoven web of claim 1, wherein the organic microfibers are comprised of melt blown microfibers that are 1 to 25 micrometers in diameter.

28. The method of claim 27, wherein the melt blown microfibers are about 2 to 15 micrometers in diameter, and wherein the heat activatable staple fibers are crimped fibers having 1 to 10 crimps per centimeter.

29. The method of claim 2, wherein the heat activatable staple fibers have 3 to 5 crimps per centimeter, and wherein the bulking staple fibers are crimped and have 1 to 10 crimps per centimeter, have deniers of 3 to 75, and have an average length of 2 to 15 centimeters.

30. The method of claim 2, wherein the organic microfibers are polypropylene melt blown microfibers that are present in the web at about 55 weight percent, the heat activatable staple fibers are bicomponent fibers that have a copolyester sheath and a polyester core and are present in the nonwoven web at about 40.5 weight percent, and the bulking staple fibers are 50 denier polyester terephthalate crimped bulking staple fibers that are present in the nonwoven web at about 4.5 weight percent.

31. The method of claim 1, wherein the heat activatable staple fibers have a length of 15 to 75 milimeters.

32. Acoustical insulation that comprises a molded, three-dimensional nonwoven fibrous web that contains:

(a) organic microfiber; and (b) 15 weight percent or greater heat activatable staple fibers that are bonded to each other and to the organic microfiber at various contact points.

33. The acoustical insulation of claim 32, wherein the nonwoven web is 0.75 to 20 centimeters thick, has a density of 6 to 200 kilograms per cubic meter, has a flexural strength of 1 to 40 pounds per square inch, has a basis weight of 50 to 4,000 grams per square meter, demonstrates an air pressure drop of 0.1 to 15 milimeters $H_2O$, has a percent solidity of 0.5 to 4, and has an average effective fiber diameter of 2 to 20 micrometers.

34. The acoustical insulation of claim 33, wherein the nonwoven web is 1 to 10 centimeters thick, has a density of 10 to 100 kilograms per cubic meter, has a flexural strength of 5 to 20 pounds per square inch, has a basis weight of 150 to 2000 grams per, square meter, demonstrates an air pressure drop greater than 0.2 milimeters $H_2O$, has a percent solidity of 1 to 3, and has an average effective fiber diameter of 5 to 17 micrometers.

35. The acoustical insulation of claim 32, wherein the nonwoven web contains 20 to 80 weight percent organic microfiber, 15 to 70 weight percent heat activatable staple fibers, and further contains 1 to 30 weight percent bulking staple fibers.

36. The acoustical insulation of claim 32, wherein the nonwoven web contains 20 to 80 weight percent organic microfiber, 30 to 50 weight percent heat activatable crimped staple fibers, and further contains 3 to 6 weight percent crimped bulking staple fibers.

37. The acoustical insulation of claim 32, wherein the organic microfibers are comprised of melt blown microfibers that are 1 to 25 micrometers in diameter.

38. The acoustical insulation of claim 32, wherein the melt blown microfibers are about 2 to 15 micrometers in diameter, and wherein the heat activatable staple fibers are crimped fibers having 1 to 10 crimps per centimeter.

39. The acoustical insulation of claim 35, wherein the heat activatable staple fibers have 3 to 5 crimps per centimeter, and wherein the bulking staple fibers are crimped and have 1 to 10 crimps per centimeter, have deniers of 3 to 75, and have an average length of 2 to 15 centimeters.

40. The acoustical insulation of claim 35, wherein the organic microfibers are polypropylene melt blown microfibers that are present in the web at about 55 weight percent, the heat activatable staple fibers are bicomponent fibers that have a copolyester sheath and a polyester core and are present in the nonwoven web at about 40.5 weight percent, and the bulking staple fibers are 50 denier polyester terephthalate crimped bulking staple fibers that are present in the nonwoven web at about 4.5 weight percent.

* * * * *